US008498455B2

(12) United States Patent
Ke et al.

(10) Patent No.: US 8,498,455 B2
(45) Date of Patent: Jul. 30, 2013

(54) SCALABLE FACE IMAGE RETRIEVAL

(75) Inventors: Qifa Ke, Cupertino, CA (US); Yi Li, Issaquah, WA (US); Heung-Yeung Shum, Medina, WA (US); Jian Sun, Beijing (CN); Zhong Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 464 days.

(21) Appl. No.: 12/792,750

(22) Filed: Jun. 3, 2010

(65) Prior Publication Data

US 2011/0299743 A1 Dec. 8, 2011

(51) Int. Cl.
*G06K 9/00* (2006.01)

(52) U.S. Cl.
USPC .......................................... 382/118

(58) Field of Classification Search
None
See application file for complete search history.

(56) References Cited

U.S. PATENT DOCUMENTS

| | | | |
|---|---|---|---|
| 5,983,237 | A | 11/1999 | Jain et al. |
| 7,050,607 | B2 | 5/2006 | Li et al. |
| 7,643,658 | B2 | 1/2010 | Kilner et al. |
| 2003/0063780 | A1 | 4/2003 | Gutta et al. |
| 2004/0158155 | A1 | 8/2004 | Njemanze |
| 2007/0140550 | A1 | 6/2007 | Li et al. |
| 2007/0172099 | A1 | 7/2007 | Park et al. |
| 2007/0189584 | A1 | 8/2007 | Li |
| 2009/0073304 | A1 | 3/2009 | Kumagai et al. |
| 2010/0172551 | A1* | 7/2010 | Gilley et al. ............. 382/118 |
| 2010/0303343 | A1* | 12/2010 | Lee et al. ................. 382/159 |
| 2012/0179689 | A1* | 7/2012 | Hornkvist et al. ....... 707/742 |

OTHER PUBLICATIONS

Gao, et al., "Discriminant Saliency for Visual Recognition from Cluttered Scene", Retreived at << http://citeseerx.ist.psu.edu/viewdoc/download?doi=10.1.1.88.6878&rep=rep1&type=pdf >>, IEEE Transactions on Pattern Analysis and Machine Intelligence, vol. 31, No. 6, Jun. 2009, pp. 8.

Deb, et al., "An Overview of Content-based Image Retrieval Techniques", Retreived at << http://citeseerx.ist.psu.edu/viewdoc/download?doi=10.1.1.116.4129&rep=rep1&type=pdf >>, AINA, Proceedings of the 18th International Conference on Advanced Information Networking and Applications, vol. 2, Mar. 29-31, 2004, pp. 6.

Mills, et al., "A Digital Photo Management System", Retrieved at << http://citeseerx.ist.psu.edu/viewdoc/download?doi=10.1.1.32.3116&rep=rep1&type=pdf >>, 2000, pp. 8.

Friedman, et al., "An Algorithm for Finding Best Matches in Logarithmic Expected Time", Retrieved at << http://www.slac.stanford.edu/cgi-wrap/getdoc/slac-pub-1549.pdf >>, ACM Transactions on Mathematical Software (TOMS), vol. 3, No. 3, Sep. 1977, pp. 38.

(Continued)

*Primary Examiner* — Claire X Wang
*Assistant Examiner* — Thomas A James
(74) *Attorney, Agent, or Firm* — Microsoft Corporation

(57) ABSTRACT

A system for identifying individuals in digital images and for providing matching digital images is provided. A set of images that include faces of known individuals is received. Faces are detected in the images and facial components are identified in each face. Visual words corresponding to the facial components are generated, stored, and associated with identifiers of the individuals. At a later time, a user may provide an image that includes the face of one of the known individuals. Visual words are determined from the face of the individual in the provided image and matched against the stored visual words. Images associated with matching visual words are ranked and presented to the user.

18 Claims, 5 Drawing Sheets

OTHER PUBLICATIONS

Gionis, et al., "Similarity Search in High Dimensions via Hashing", Retrieved at << http://eprints.kfupm.edu.sa/65027/1/65027.pdf >>, Very Large Data Bases, Proceedings of the 25th International Conference on Very Large Data Bases, Sep. 7-10, 1999, pp. 12.

Huang, et al., "Labeled Faces in the Wild: A Database for Studying Face Recognition in Unconstrained Environments", Retrieved at << http://citeseerx.ist.psu.edu/viewdoc/download?doi=10.1.1.122.8268&rep=rep1&type=pdf >>, Tech. Rep. 07-49, University of Massachusetts, Amherst, Mass, Oct. 2007, pp. 1-14.

Jegou, et al., "Hamming Embedding and Weak Geometric Consistency for Large Scale Image Search", Retrieved at << http://webdocs.cs.ualberta.ca/~jag/papersVis2/08ECCV/papers/5302/53020304.pdf >>, Lecture Notes in Computer Science; vol. 5302, Proceedings of the 10th European Conference on Computer Vision: Part I, Oct. 12-18, 2008, pp. 30.

Jegou, et al., "Packing Bag-of Features", Retrieved at << https://lear.inrialpes.fr/pubs/2009/JDS09b/jegou_packingbof.pdf >>, 2009, pp. 8.

Kumar, et al., "Attribute and Simile Classifiers for Face Verification", Retrieved at << http://www1.cs.columbia.edu/CAVE/publications/pdfs/Kumar_ICCV09.pdf >>, in IEEE International Conference on Computer Vision (ICCV), 2009, pp. 8.

Lei, et al., "Face Recognition with Local Gabor Textons", Retrieved at << http://www.cbsr.ia.ac.cn/users/zlei/papers/icb07/Gabor_texton_icb07.pdf >>, International Conference on Biometrics, 2007, pp. 49-57.

Liang, et al., "Face Alignment via Component-Based Discriminative Search", Retrieved at << http://research.microsoft.com/en-us/um/people/jiansun/papers/ECCV08_FaceAlign.pdf >>, Lecture Notes in Computer Science; vol. 5303, Proceedings of the 10th European Conference on Computer Vision: Part II, Oct. 12-18, 2008, pp. 14.

Schroeder, Pierre, "Distinctive Image Features from Scale-Invariant Keypoints", Retrieved at << http://www.ai.rug.nl/vakinformatie/cogrobot/content/SIFT.pdf >>, Nov. 5, 2008, pp. 16.

Manning, et al., "Introduction to Information Retrieval", Retrieved at << http://dspace.cusat.ac.in/dspace/bitstream/123456789/2538/1/InformationRetrieval.pdf >>, Apr. 1, 2009, pp. 569.

Matas, et al., "Robust Wide Baseline Stereo from Maximally Stable Extremal Regions", Retrieved at << http://citeseerx.ist.psu.edu/viewdoc/download?doi=10.1.1.7.2484&rep=rep1&type=pdf >>, Image and Vision Computing, 22 (10), 2002, pp. 384-393.

Mikolajczyk, et al., "A Performance Evaluation of Local Descriptors", Retrieved at << http://www.dei.unipd.it/~guerra/3D/papers/PerformanceShapeDescriptors.pdf >>, IEEE Transactions on Pattern Analysis and Machine Intelligence, vol. 27, No. 10, Oct. 2005, pp. 1-34.

Mikolajczyk, et al., "A Comparison of Affine Region Detectors", Retrieved at << http://www.esat.kuleuven.be/psi/visics/research/publications/papers/vibes_ijcv2004.pdf >>, International Journal of Computer Vision, vol. 65, No. 1-2, Nov. 2005, pp. 43-72.

Nister, et al., "Scalable Recognition with a Vocabulary Tree", Retrieved at << http://www.eecs.berkeley.edu/~yang/courses/cs294-6/papers/nister_stewenius_cvpr2006.pdf >>, CVPR, Proceedings of the 2006 IEEE Computer Society Conference on Computer Vision and Pattern Recognition—vol. 2, Jun. 17-22, 2006, pp. 8.

Ojala, et al., "Multiresolution Gray-Scale and Rotation Invariant Texture Classification with Local Binary Patterns", Retrieved at <<http://www.mediateam.oulu.fi/publications/pdf/94.p >>, IEEE Transactions on Pattern Analysis and Machine Intelligence, vol. 24, No. 7, Jul. 2002, pp. 971-987.

Philbin, et al., "Object Retrieval with Large Vocabularies and Fast Spatial Matching", Retrieved at http://www.cise.ufl.edu/~jho/CIS6930/Papers/Sivic07.pdf >>, presented at Computer Vision and Pattern Recognition, CVPR '07. IEEE Conference on, 2007, pp. 8.

Philbin, et al., "Lost in Quantization: Improving Particular Object Retrieval in Large Scale Image Databases", Retreived at << http://webdocs.cs.ualberta.ca/~jag/papersVis2/08cvpr/data/papers/295.pdf >>, Jun. 2008, pp. 8.

Pinto, et al., "How Far Can You Get with a Modern Face Recognition Test Set Using Only Simple Features", Retrieved at << http://www.rowland.harvard.edu/rjf/cox/Publications/pinto-dicarlo-cox-cvpr-2009-mkl.pdf >>, IEEE Conference on Computer Vision and Pattern Recognition, Jun. 20-25, 2009, pp. 8.

Sivic, et al., "A Text Retrieval Approach to Object Matching in Videos", Retreived at << http://www.robots.ox.ac.uk/~vgg/publications/papers/sivic03.pdf >>, ICCV, Proceedings of the Ninth IEEE International Conference on Computer Vision—vol. 2, Oct. 13-16, 2003, pp. 1-8.

Tan, et al., "Enhanced Local Texture Feature Sets for Face Recognition Under Difficult Lighting Conditions", Retrieved at << http://eprints.pascal-network.org/archive/00003658/01/08-x-tan-amfg2007.pdf >>, IEEE Transactions on Image Processing, Volume in press, 2010, pp. 15.

Viola, et al., "Rapid Object Detection using a Boosted Cascade of Simple Features", Retreived at << http://www.techfak.uni-bielefeld.de/~iluetkeb/2006/surveillance/paper/detection/Viola2001-ROD.pdf >>, Accepted Conference on Computer Vision and Pattern Recognition, 2001, pp. 1-9.

Winder, et al., "Learning Local Image Descriptors", Retrieved at << http://research.microsoft.com/pubs/74480/winder_brown_cvpr07.pdf >>, in CVPR, 2007, pp. 8.

Wolf, et al., "Descriptor Based Methods in the Wild", Retrieved at << http://hal.inria.fr/docs/00/32/67/29/PDF/Wolf_patchlbp.pdf >>, In: Faces in Real-Life Images Workshop in ECCV (2008), Similarity Scores based on Background Samples, 2008, pp. 1-14.

Wright, et al., "Implicit Elastic Matching with Random Projections for Pose-Variant Face Recognition", Retreived at http://www.eecs.northwestern.edu/~ganghua/publication/CVPR09a.pdf >>, IEEE Conference on Computer Vision and Pattern Recognition, Jun. 20-25, 2009, pp. 1502-1505.

Zhang, et al., "Face Detection Based on Multi-Block Lbp Representation", Retrieved at << http://www.springerlink.com/index/x1579553813562tr.pdf >>, Lecture Notes in Computer, 2007, pp. 11-18.

\* cited by examiner

SCALABLE FACE IMAGE RETRIEVAL

BACKGROUND

As digital imaging such as digital photography grows in popularity, demand for image retrieval and identification systems has increased. In current image retrieval systems, users are able to search for images by providing a query. Images matching the query may then be returned to the user. However, the matching images are generally found using text accompanying the image or using tags that have been associated with the images by users, and are not found based on the contents of the images themselves.

One popular application using image retrieval and identification systems identifies a person based on an image of the person, or identifies all images in a collection of a particular person based on an image of the person. For example, a user can search for all images in their private collection that include an image of their father. However, these systems for image retrieval and identification using visual words are typically ineffective for face based image searching because they produce visual words with low discriminative power for face images and they ignore the properties of faces. Existing systems for facial recognition can achieve good retrieval performance, but are generally not scalable to large collections of images because of their associated storage and performance costs.

SUMMARY

A system for identifying individuals in digital images and for providing matching digital images is provided. A set of images that include faces of known individuals such as celebrities is received. Faces are detected in the images and a number of facial components are identified in each face. Visual words corresponding to the facial components are generated, stored, and associated with identifiers of the individuals. At a later time, a user may provide an image that includes the face of one of the known individuals. Visual words are extracted from the face of the individual in the provided image and matched against the stored visual words. Images associated with matching visual words are ranked and presented to the user.

In an implementation, an image is received at a computing device. A face is detected in the image. Facial components of the detected face are identified in the image. Visual words are generated from the identified facial components by the computing device. The generated visual words from the identified facial components are compared with stored visual words by the computing device. Each visual word may be associated with one or more stored images. One or more candidate matching images are determined from the stored images based on the comparison by the computing device.

Implementations may include some or all of the following features. The identified facial components may be normalized. The facial components may include five facial components. A grid of elements may be defined for each facial component. Generating visual words from the identified facial components may include extracting an image patch from each grid element of an identified facial component, and computing a descriptor for each extracted image patch. A set of reference images may be selected from the candidate matching images, a distance between the reference images and the candidate matching images may be determined, and the candidate matching images may be ranked based on the determined distances. Selecting a set of reference images from the candidate matching images may include generating a hamming signature of the received image and each of the candidate matching images, and selecting the candidate matching images that have hamming signatures that are the closest distance to the hamming signature of the first image and one or more previous candidate matching images.

In an implementation, images are received by a computing device through a network. Each image includes a face associated with an individual. The face is detected in each of the images by the computing device. Facial components for each detected face are identified by the computing device. Visual words are generated from the identified facial components of each detected face by the computing device. The generated visual words are stored with an identifier of the individual associated with the detected face included in the image and an identifier of the image by the computing device.

Implementations may include some or all of the following features. Storing the generated visual words may include storing the generated visual words as an inverted index. Generating visual words from the identified facial components of each detected face may include defining a grid of elements for each facial component, extracting an image patch from each grid element, and computing a descriptor for each extracted image patch. An image may be received. A face may be detected in the image. Facial components of the detected face may be identified in the image. Visual words may be generated from the identified facial components. The generated visual words from the identified facial components may be compared with the stored visual words. One or more candidate matching images may be determined based on the comparison.

This summary is provided to introduce a selection of concepts in a simplified form that is further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
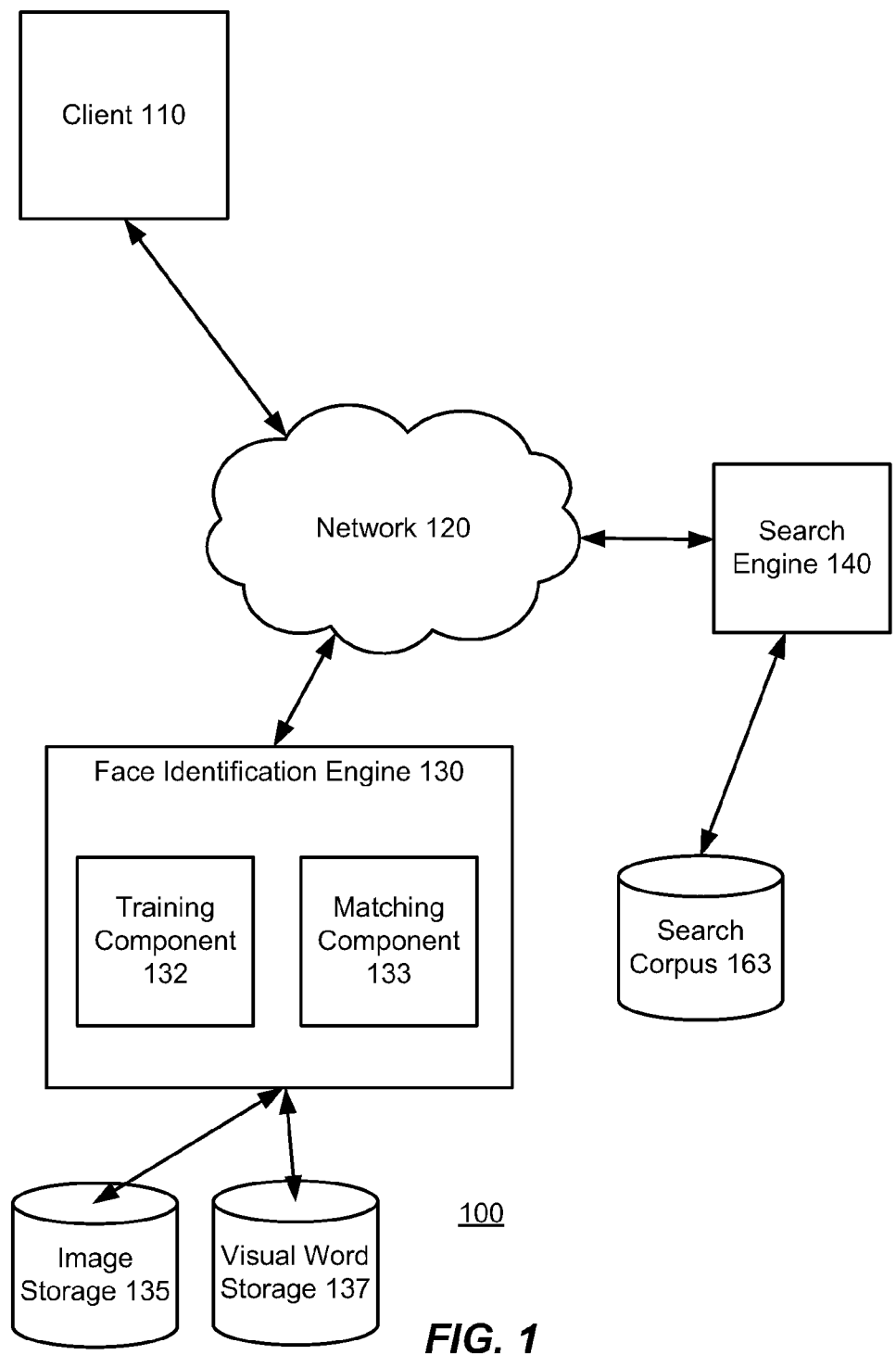
FIG. 1 is an illustration of an exemplary environment for ranking and identifying images responsive to a received image query.

FIG. 1 is an illustration of an exemplary environment 100 for ranking and identifying images responsive to a received image query. A client 110 may communicate with a search engine 140 through a network 120. The client 110 may be configured to communicate with the search engine 140 to access, receive, retrieve and display documents and other information such as webpages and images. The network 120 may be a variety of network types including the public switched telephone network (PSTN), a cellular telephone network, and a packet switched network (e.g., the Internet).

In some implementations, the client 110 may include a desktop personal computer, workstation, laptop, PDA, cell phone, or any WAP-enabled device or any other computing device capable of interfacing directly or indirectly with the network 120. The client 110 may run an HTTP client, e.g., a browsing program, such as MICROSOFT INTERNET EXPLORER or other browser, or a WAP-enabled browser in the case of a cell phone, PDA or other wireless device, or the like, allowing a user of the client 110 to access, process and view information and pages available to it from the search engine 140. The client 110 may be implemented using a general purpose computing device such as a computing device 500 described with respect to FIG. 5, for example.

The search engine 140 may be configured to receive queries from users using clients such as the client 110. The search engine 140 may search for documents and other media or content that is responsive to the query by searching a search corpus 163 using the received query. The search corpus 163 may be an index of documents such as webpages, advertisements, product descriptions, image data, video data, map data, etc. The search engine 140 may return a webpage to the client 110 including indicators such as links to some subset of the documents that are responsive to the query.

The environment 100 may further include a face identification engine 130. In some implementations, the face identification engine 130 may receive what is referred to herein as an image query. An image query is a digital image and may include an image of a face associated with one or more individuals. The image query may be received directly from a user of a client 110 or indirectly from the search engine 140, for example. The face identification engine 130 may be implemented by a general purpose computing device such as the computing device 500 described with respect to FIG. 5, for example. While the face identification engine 130 is shown separately from the search engine 140, it is for illustrative purposes only; it is contemplated that the face identification engine 130 may be part of the search engine 140.

In some implementations, the face identification engine 130 may receive an image, identify a face in the image, and identify one or more images that include the individual associated with the identified face. The identified images may be presented, via the client 110, to the user that submitted the image query. In other implementations, the face identification engine 130 may receive an image, identify a face in the image, and present the identity of the individual associated with the identified face. The face identification engine 130 may further present additional images of the individual associated with the identified face, or may present information about the individual associated with the identified face.

The face identification engine 130 may include a training component 132. The training component 132 may process a plurality of images of faces associated with individuals to generate visual words that may be used to identify a face in an image query. The plurality of images may be stored in an image storage 135. The plurality of images stored in the image storage 135 may be selected and/or retrieved from the Internet or some other image source(s), for example.

In some implementations, each image in the image storage 135 may include at least one face and may be associated with an individual. The individuals may be celebrities, politicians, actors, actresses, or any other individual likely to be part of an image query. In implementations where the face identification engine 130 is part of an image management application, the images in the image storage 135 may correspond to images from a user's personal photos and many include individuals such as family members or friends. Other implementations may include images of employees or known criminals or terrorists, for example.

The image storage 135 may include multiple images for each individual for the training component 132 to train on. The greater the number of images provided for each individual, the more comprehensive the face representation of the individual. However, more images for each individual may increase the amount of computational resources used for the training component 132 to process the images, as well as the amount of computational resources used to identify matching images.

The training component 132 may detect faces in each of the images in the image storage 135. The training component 132 may identify the faces in the images using any one or more of a variety of well known face identification methods or techniques.

The training component 132 may, for each detected face, identify facial components in the detected face. In some implementations, the identified facial components may include a nose, two eyes, a left mouth region, and a right mouth region. More or fewer facial components may be indentified in alternative implementations. The facial components may be identified using a neural network, for example.

The training component 132 may transform each image based on the detected facial components. For example, each image of an individual may be from a different angle, perspective, or distance and each face may be located in a different location of an image. The training component 132 may transform the faces in the image to account for such variations by transforming the images about one of the facial components. For example, the faces may be moved, scaled, and/or rotated such that the two eye facial components line up in each image. Other methods for image transformations may also be used.

The training component 132 may, for each detected facial component, generate one or more visual words. In an implementation, each visual word may be a concatenation of an identifier of an individual and an identifier of the facial component. The generated visual words may be stored in a visual word storage 137. Thus, the visual word storage 137 may store a plurality of visual words corresponding to facial components of one or more individuals associated with an image in the image storage 135. The visual words in the visual word storage 137 may be stored as an inverted index. Other data structures or index types may be used. As described further below, each generated visual word may be further associated with a descriptor computed for the facial component identified by the visual word.

In some implementations, the training component 132 may generate the visual words for a facial component by defining a grid of elements on a facial component. In some implementations, each grid may be 5 elements by 7 elements. Other grid sizes may be used. Each grid element may include a predetermined number of pixels. The number of pixels encompassed by a grid element may depend on the resolution of the associated image, for example.

The training component 132 may extract an image patch defined by each grid element and compute a descriptor of the extracted image patch. The image patch may comprise a set of pixels included in a grid element. A descriptor is a numerical description of the visual features of an image or image patch. For example, the descriptor may describe the color, shapes, and/or textures contained in an image patch. Any one of a variety of well known methods for generating a descriptor may be used. In some implementations, the descriptor may be a T3h-S2 descriptor (e.g., responses of steerable filters).

In some implementations, the training component 132 may associate a computed descriptor with a visual word using quantization. The quantization may be performed by the training component 132 by performing a nearest neighbor search using the computed descriptor to a set of previously computed descriptors. The computed descriptor is then associated with the visual word or words of the corresponding nearest neighbors.

The environment 100 may further include a matching component 133. The matching component 133 may identify one or more images from the image storage 135 that are associated with the same individual as an image provided to the face identification engine 130 in an image query. Alternatively, or additionally, the matching component 133 may provide the identity of a person in a provided image, additional images of the person, or information about the person.

In some implementations, the matching component 133 may receive an image. The image may be provided by the face identification engine 130 and may have been received as part of an image query. Similarly as the training component 132, the matching component 133 may detect a face in the image, identify one or more facial components in the detected face, generate descriptors based on the identified facial components, and identify one or more visual words that correspond to the facial components using the descriptors. The matching component 133 may then compare the identified visual words with the stored visual words in the inverted index of the visual word storage 137.

In some implementations, the matching component 133 may further receive an indication of a scenario along with the image query. For example, the scenario may specify that the user is only interested in celebrities that match the image in the image query. The matching component 133 may then limit the images from the image store 133 that are considered for matches to images that are associated with celebrities. Other types of scenarios may be indicated. For example, scenarios may be based on age, sex, nationality, etc.

The matching component 133 may determine a set of candidate matching images based on the comparisons of the visual words from the image with the stored visual words from the images in the image storage 135. In some implementations, the candidate matching images may be the images that have the greatest number of associated visual words that match the visual words from the received image. In implementations where a scenario is indicated, the matching component 133 may limit the images considered to those matching the indicated scenario, for example.

In some implementations, the matching component 133 may further aggregate metadata or other information associated with the candidate matching images and may present the aggregated metadata to a user. For example, the matching component 133 may present the names of the individuals associated with the candidate matching images (e.g., the most common names associated with the webpages that includes the candidate matching images). The user may then select the name of the person that they were looking for, or refine their initial image query based on the names that are provided.

The matching component 133 may further rank the candidate matching images, and present the highest ranked candidate matching images to a user, e.g. via the client 110, who provided the image query. In some implementations, the matching component 133 may rank the candidate matching images by selecting a set of reference images. The references images may then be used to rank the candidate matching images based on the similarity between the candidate matching images and the reference images.

In some implementations, the matching component 133 may select the reference images by computing hamming signatures of the candidate matching images and the received image. A hamming signature may be computed based on what are known as learning based descriptors. For a detected face in an image, a code is generated from each pixel in a grid element using a learning based encoder. These codes are aggregated for each grid element to create a histogram for each grid element. The resulting histograms are concatenated and compressed using principal component analysis, for example, to generate the learning based descriptor for the image. In some implementations, the learning based descriptor is a 400 dimension descriptor.

In some implementations, the hamming signature for an image may be generated by the matching component 133 from the learning based descriptors. The matching component 133 may randomly sample learning based descriptors generated from the image and learning based descriptors generated from images associated with the same individual in multiple directions. The median sampled value for each direction may be selected for the hamming signature.

The matching component 133 may use the computed hamming signatures to rank the candidate images. In a first iteration, the matching component 133 may select an image from the set of candidate matching images whose hamming signature has a shortest computed distance from the hamming signature of the received image. The distance between two hamming signatures may be determined by subtracting each value for each direction from each hamming signature. The selected image may then be added to the set of reference images. In subsequent iterations, the matching component 133 may select an image from the set of candidate matching images that minimizes the distance between the selected image, the images from the set of reference images, and the received image. The matching component 133 may continue to select images for the set of reference images until the set reaches a threshold size or the minimum computed distance for a selected image is above a threshold minimum distance, for example.

In an implementation, the matching component 133 may calculate the distance between the candidate matching images and the reference images based on their hamming signatures, and may rank the candidate matching images from a lowest calculated distance to a highest calculated distance. The matching component 133 may then present the candidate matching images to the user, e.g. via a computing device such as the client 110, who provided the query in ranked order. Alternatively, or additionally, the matching component 133 may provide the identity information or identities of the individuals associated with the top ranked candidate matching images.

Figure 2:
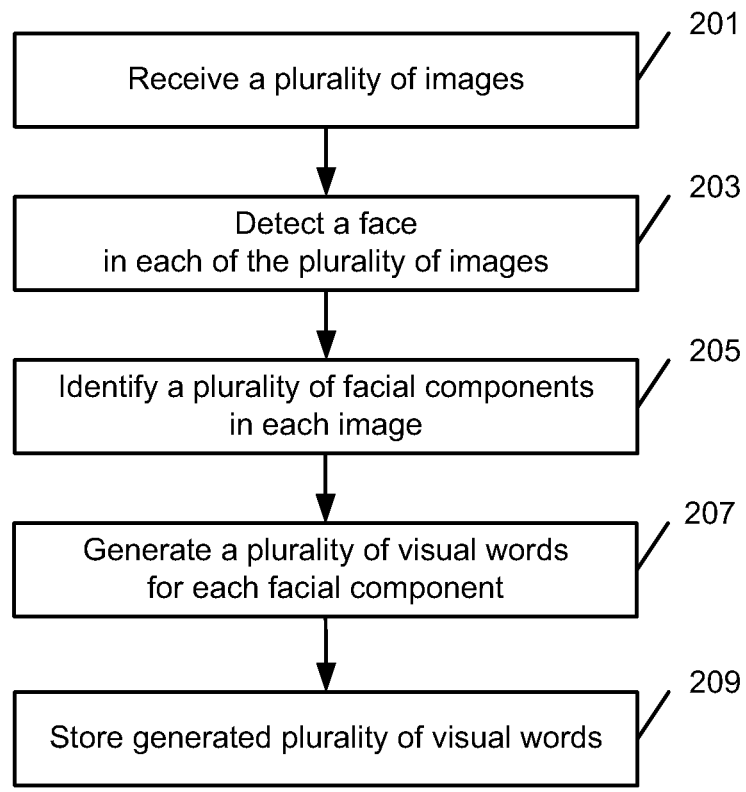
FIG. 2 is an operational flow of an implementation of a method for training a face identification engine.

FIG. 2 is an operational flow of an implementation of a method 200 for training a face identification engine. The method 200 may be implemented by the training component 132 of the face identification engine 130.

A plurality of images is received at 201. The plurality of images may be received by the training component 132 of the face identification engine 130. The plurality of images may be received from the image storage 135. Each of the plurality of images may include a face (i.e., an image of a face), and each image may be associated with an individual. To facilitate the training of the face identification engine 130 to recognize the one or more individuals associated with each image, there may be multiple images associated with each individual.

A face is detected in each of the plurality of images at 203. A face may be detected in each image by the training component 132 of the face identification engine 130. The faces may be detected using a variety of well known face detection techniques.

A plurality of facial components is identified in each image at 205. The plurality of facial components may be identified in each detected face by the training component 132 of the face identification engine 130. In some implementations, the facial components may be detected using neural networks. Other methods may also be used. In an implementation, there may be five facial components detected corresponding to the eyes, the nose, and a left and right side of the mouth, for example. More or fewer facial components may be detected.

A plurality of visual words is generated for each identified facial component at 207. The visual words may be generated by the training component 132 of the face identification engine 130. In some implementations, a grid of elements may be defined at each detected facial component, and an image patch may be extracted from each grid element. A descriptor may be computed for each extracted image patch. In some implementations 175 descriptors may be computed for each image; however, more or fewer descriptors may be computed. Each descriptor may be quantized to determine one or more visual words corresponding to the descriptor. In some implementations, the quantization may be performed using a nearest neighbor search of previously computed descriptors.

The plurality of generated visual words is stored at 209. The generated visual words may be stored by the training component 132 of the face identification engine 130 in the visual word storage 137. In some implementations, each visual word may be a concatenation of an identifier of an individual and an identifier of the facial component corresponding to the visual word. The visual word may further be associated with its computed descriptor. The visual words may be stored as an inverted index. Other data structures may also be used.

Figure 3:
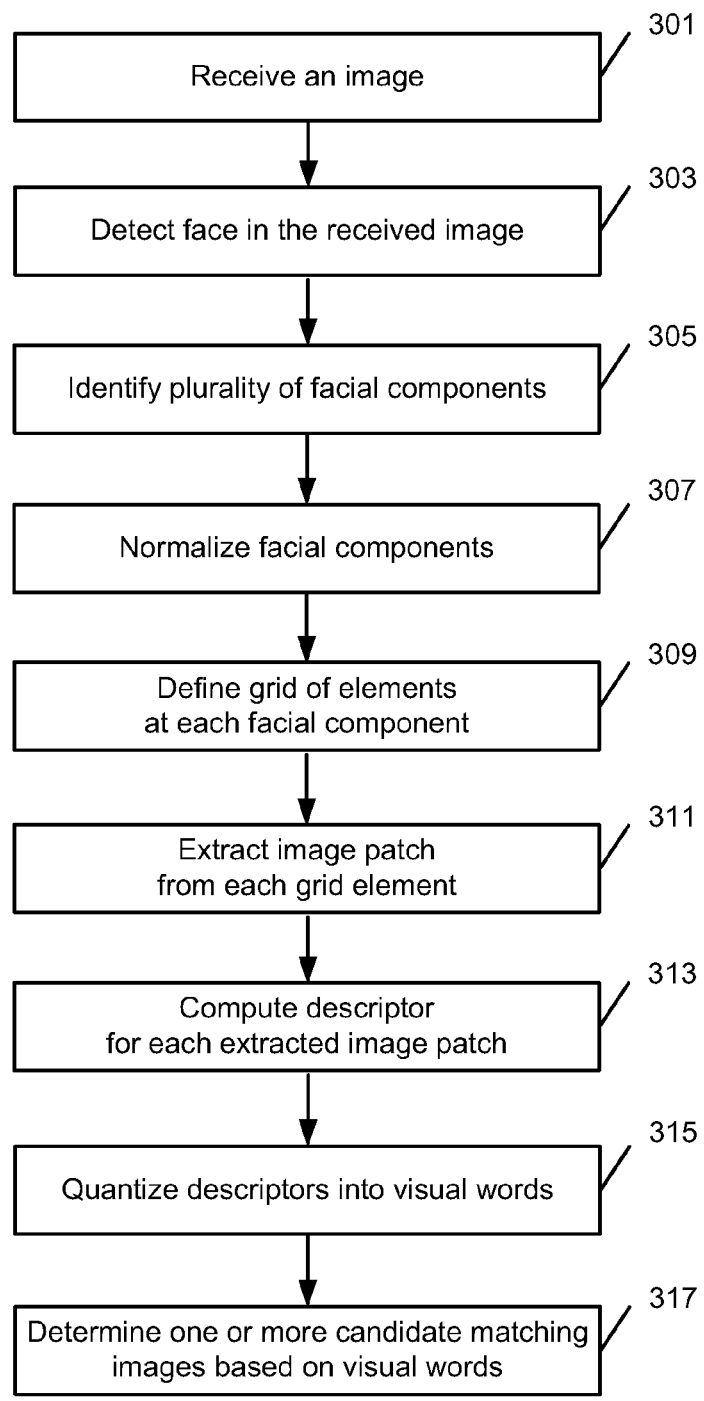
FIG. 3 is an operational flow of an implementation of a method for determining one or more candidate matching images based on a received image.

FIG. 3 is an operational flow of an implementation of a method 300 for determining one or more candidate matching images based on a received image. The method 300 may be implemented by the matching component 133 of the face identification engine 130.

An image is received at 301. The image may be received by the matching component 133 of the face identification engine 130. The image may be received from a user of a client 110 as part of an image query. For example, the user may want to find images of the same individual pictured in the received image, or may want to learn the identity of a person pictured in the image.

A face is detected in the received image at 303. The face may be detected by the matching component 133 of the face identification engine 130. The face may be detected using any of a variety of well known facial detection techniques.

A plurality of facial components is identified at 305. The facial components may be identified by the matching component 133 of the face identification engine 130. In some implementations the facial components may be identified using a neural network. Other methods may also be used.

The facial components are normalized at 307. The facial components may be normalized by the matching component 133 of the face identification engine 130. Because the face in the image may be taken at an angle or may not be centered in the image, the facial components may be normalized so that the facial components appear in a standard location in the image. In some implementations, the facial components may be normalized with respect to the two eye facial components, for example. Any method for image normalization may be used.

A grid of elements is defined at each facial component at 309. The grid of elements may be defined by the matching component 133 of the face identification engine 130. In some implementations, each grid may include 35 elements. Other size grids may be used.

An image patch is extracted from each grid element at 311. The image patches may be extracted by the matching component 133 of the face identification engine 130. Each image patch may include a plurality of pixels corresponding to the pixels contained in the respective grid element.

A descriptor is computed for each extracted image patch at 313. Each descriptor may be computed by the matching component 133 of the face identification engine 130. The descriptors may comprise T3h-S2 descriptors, for example. Other types of descriptors may be used.

The computed descriptors are quantized to determined visual words at 315. The descriptors may be quantized by the matching component 133 of the face identification engine 130. In some implementations, the descriptors may be quantized by performing a nearest neighbor search of the descriptors previously computed for one or more stored images. In some implementations, the nearest neighbor search may only be performed for descriptors associated with the same facial component. As described above, the descriptors may be part of the stored visual words and may be compared with the descriptors for each of the stored visual words in the visual word storage 137. In some implementations, descriptors may only be compared with descriptors that are part of stored visual words that have an identifier of the same grid element or facial component. The result of the quantization may be one or more visual words.

One or more candidate matching images are determined based on the visual words at 317. The candidate matching images may be determined by the matching component 133 of the face identification engine 130. The candidate matching images may be the images from the image storage 135 that are associated with the visual words as the visual words determined at 315. The candidate matching images and/or aggregated metadata associated with the candidate matching images may be presented to the user who submitted the image query, or as described further herein, the candidate matching images may be ranked based on a comparison with one or more reference images. In some implementations, the candidate matching images may be ranked based on the number of matching visual words associated with each candidate image, for example. The candidate matching images may be automatically selected, or selected manually by a human.

Figure 4:
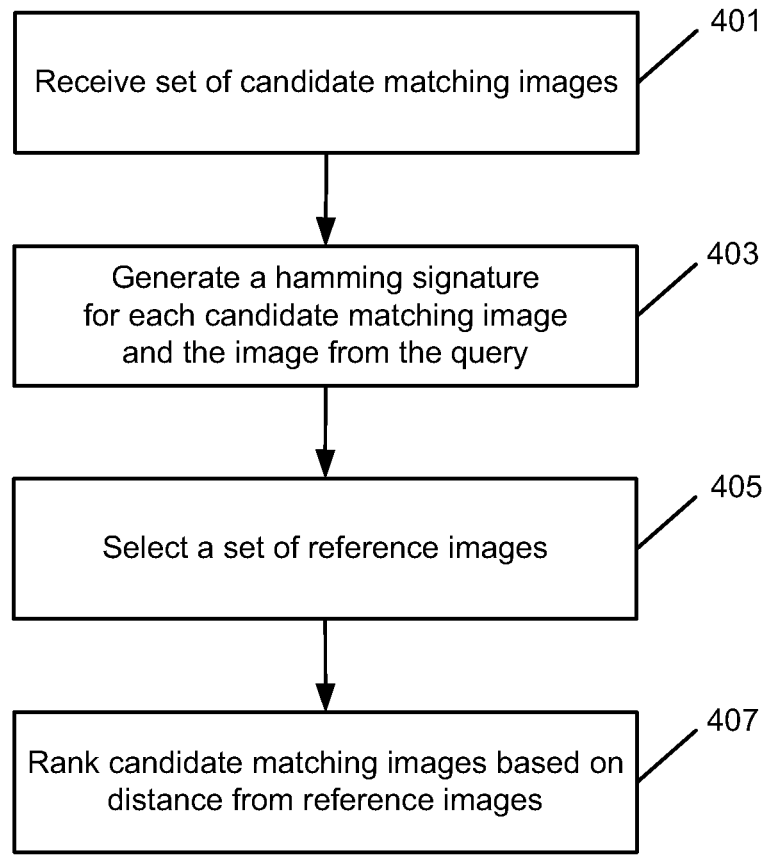
FIG. 4 is an operational flow of an implementation of a method for ranking candidate matching images.

FIG. 4 is an operational flow of an implementation of a method 400 for ranking candidate matching images. The method 400 may be implemented by the matching component 133 of the face identification engine 130.

A set of candidate matching images is received at 401. The set of candidate matching images may be received by the matching component 133 of the face identification engine 130. The set of candidate matching images may have been selected by the matching component 133 using an image received in a query.

A hamming signature is generated for each candidate matching image and the image from the query at 403. The hamming signatures may be generated by the matching component 133 of the face identification engine 130.

A set of reference images is selected at 405. The set of reference images may be selected by the matching component 133 of the face identification engine 130. In some implementations, the set of reference images may be selected from the candidate matching images in iterations. At a first iteration, an image from the candidate matching images may be selected for the set of reference images whose hamming signature is closest to the hamming signature of the image from the query. In subsequent iterations, an image from the candidate matching images may be selected for the set of reference images whose hamming signature is closest to the hamming signature of the image from the query and the images in the set of reference images. The matching component 133 may continue to select reference images until the number of selected images exceeds a threshold, or the calculated distance between a hamming signature of a remaining image in the candidate matching images and the images in the set of reference images falls below a minimum distance.

The candidate matching images are ranked based on a distance from the reference images at 407. The candidate matching images may be ranked by the matching component 133 of the face identification engine 130. The top ranked candidate matching images may be presented to a user, for example. The distances between the images may be based on the calculated hamming signatures, for example.

Figure 5:
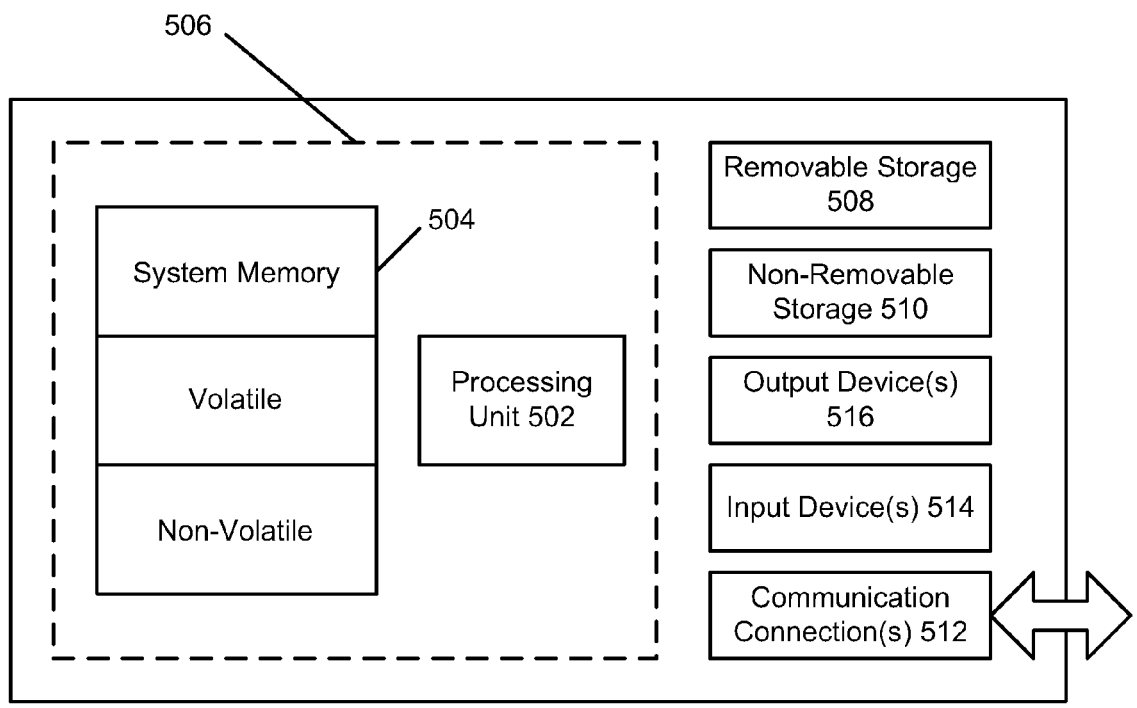
FIG. 5 is a block diagram of a computing system environment according to an implementation of the present system.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network personal computers, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communications connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving an image at a computing device;
   detecting a face in the image by the computing device;
   identifying a plurality of facial components of the detected face in the image by the computing device;
   generating a plurality of visual words from the identified plurality of facial components by the computing device;
   comparing the generated plurality of visual words from the identified facial components with a plurality of stored visual words by the computing device, wherein each visual word is associated with one of a plurality of stored images;

determining a plurality of candidate matching images from the plurality of stored images based on the comparison by the computing device;

selecting a plurality of reference images from the plurality of candidate matching images by the computing device;

for each candidate matching image of the plurality of candidate matching images, determining a distance between the candidate matching image and each reference image of the plurality of reference images by the computing device; and ranking the candidate matching images based on the determined distances by the computing device.

2. The method of claim 1, further comprising identifying at least one individual associated with the plurality of candidate matching images.

3. The method of claim 2, further comprising one of providing information about the individual associated with the plurality of candidate matching images, and providing images of the individual associated with the plurality of candidate matching images.

4. The method of claim 1, further comprising defining a grid of elements for each facial component in the plurality of facial components.

5. The method of claim 4, wherein generating a plurality of visual words from the identified plurality of facial components comprises:

extracting an image patch from each grid element of an identified facial component; and computing a descriptor for each extracted image patch.

6. The method of claim 1, wherein selecting a plurality of reference images from the plurality of candidate matching images comprises:

generating a hamming signature of the received image and each of the plurality of candidate matching images; and selecting the candidate matching images that have hamming signatures that have a closest distance to the hamming signature of the received image and one or more previously selected candidate matching images.

7. A method comprising:

receiving a plurality of images by a computing device, wherein each image includes a face associated with an individual;

detecting the face in each of the plurality of images by the computing device;

identifying a plurality of facial components for each detected face by the computing device;

generating a plurality of visual words from the identified plurality of facial components of each detected face by the computing device;

for each generated plurality of visual words, storing the generated plurality of visual words by the computing device;

receiving an image by the computing device, wherein the image is not part of the plurality of images;

determining a plurality of candidate matching images from the plurality of images for the received image by the computing device;

selecting a plurality of reference images from the plurality of candidate matching images by the computing device;

for each candidate matching image of the plurality of matching images, determining a distance between the candidate matching image and each reference image of the plurality of reference images by the computing device; and ranking the candidate matching images based on the determined distances by the computing device.

8. The method of claim 7, wherein storing the generated plurality of visual words comprises storing the generated plurality of visual words as an inverted index.

9. The method of claim 7, wherein generating a plurality of visual words from the identified plurality of facial components of each detected face comprises:

defining a grid of elements for each facial component from the plurality of facial components;

extracting an image patch from each grid element; and computing a descriptor for each extracted image patch.

10. The method of claim 7, wherein determining a plurality of candidate matching images from the plurality of images for the received image comprises:

detecting a face in the image;

identifying a plurality of facial components of the detected face in the image;

generating a plurality of visual words from the identified plurality of facial components;

comparing the generated plurality of visual words from the identified facial components with the plurality of stored visual words; and determining the plurality of candidate matching images from the plurality of images for the received image based on the comparison.

11. The method of claim 7, wherein selecting a plurality of reference images from the plurality of candidate matching images comprises:

generating a hamming signature of the received image and each of the plurality of candidate matching images; and selecting the candidate matching images that have hamming signatures that have a closest determined distance to the hamming signature of the first image and one or more previously selected candidate matching images.

12. The method of claim 11, wherein the candidate matching images are manually selected.

13. A system comprising:

at least one computing device;

a training component that:

receives a plurality of images, wherein each image includes a face associated with an individual;

detects the face in each of the plurality of images;

for each detected face, identifies a plurality of facial components of the detected face;

for each identified facial component, generates a plurality of visual words from the identified facial component of the detected face; and for each generated plurality of visual words, stores the generated plurality of visual words with an identifier of the individual associated with the detected face included in the image and an identifier of the image; and a matching component that:

receives an image, wherein the image is not part of the plurality of images;

detects a face in the image;

identifies a plurality of facial components of the detected face in the image;

generates a plurality of visual words from the identified plurality of facial components;

compares the generated plurality of visual words from the identified facial components with the plurality of stored visual words;

determines a plurality of candidate matching images from the plurality of images for the received image based on the comparison;

selects a plurality of reference images from the plurality of candidate matching images;

for each candidate matching image of the plurality of matching images, determines a distance between the candidate matching image and each reference image of the plurality of matching images; and ranks the candidate matching images based on the determined distances.

14. The system of claim 13, wherein the training component stores the generated plurality of visual words as an inverted index.

15. The system of claim 13, wherein the training component further normalizes the identified plurality of facial components.

16. The system of claim 13, wherein the plurality of facial components comprises a nose, two eyes, a left mouth region, and a right mouth region.

17. The system of claim 13, wherein the matching component selects a plurality of reference images from the plurality of candidate matching images by:

generating a hamming signature of the received image and each of the plurality of candidate matching images; and selecting the candidate matching images that have hamming signatures that have a closest distance to the hamming signature of the first image and one or more previously selected candidate matching images.

18. The method of claim 1, further comprising receiving an indication of a scenario with the received image, and wherein determining the plurality of candidate matching images from the plurality of stored images based on the comparison further comprises determining the plurality of candidate matching images based on the scenario.

* * * * *

UNITED STATES PATENT AND TRADEMARK OFFICE
CERTIFICATE OF CORRECTION

PATENT NO. : 8,498,455 B2  
APPLICATION NO. : 12/792750  
DATED : July 30, 2013  
INVENTOR(S) : Ke et al.

Page 1 of 1

It is certified that error appears in the above-identified patent and that said Letters Patent is hereby corrected as shown below:

In Title page, in item (56), under "Other Publications" column 2, line 2, delete "Retreived" and insert -- Retrieved --, therefor.

In Title page 2, in item (56), under "Other Publications" column 2, line 14, delete "Retreived" and insert -- Retrieved --, therefor.

In Title page 2, in item (56), under "Other Publications" column 2, line 23, delete "Retreived" and insert -- Retrieved --, therefor.

In Title page 2, in item (56), under "Other Publications" column 2, line 33, delete "Retreived" and insert -- Retrieved --, therefor.

In Title page 2, in item (56), under "Other Publications" column 2, line 37, delete "Retreived" and insert -- Retrieved --, therefor.

In Title page 2, in item (56), under "Other Publications" column 2, line 40, delete "Retreived" and insert -- Retrieved --, therefor.

In Title page 2, in item (56), under "Other Publications" column 2, line 45, delete "Retreived" and insert -- Retrieved --, therefor.

In the Specification

In column 4, line 25, delete "indentified" and insert -- identified --, therefor.

Signed and Sealed this
Twenty-sixth Day of May, 2015

Michelle K. Lee
*Director of the United States Patent and Trademark Office*